US 12,043,574 B2

(12) United States Patent
Shimizu et al.

(10) Patent No.: US 12,043,574 B2
(45) Date of Patent: Jul. 23, 2024

(54) GLASS PANEL UNIT MANUFACTURING METHOD

(71) Applicant: PANASONIC INTELLECTUAL PROPERTY MANAGEMENT CO., LTD., Osaka (JP)

(72) Inventors: Takeshi Shimizu, Osaka (JP); Masataka Nonaka, Osaka (JP); Haruhiko Ishikawa, Osaka (JP); Eiichi Uriu, Osaka (JP); Kazuya Hasegawa, Osaka (JP); Tasuku Ishibashi, Ishikawa (JP); Hiroyuki Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 911 days.

(21) Appl. No.: 17/059,044

(22) PCT Filed: Apr. 15, 2019

(86) PCT No.: PCT/JP2019/016174
§ 371 (c)(1),
(2) Date: Nov. 25, 2020

(87) PCT Pub. No.: WO2019/230221
PCT Pub. Date: Dec. 5, 2019

(65) Prior Publication Data
US 2021/0221737 A1    Jul. 22, 2021

(30) Foreign Application Priority Data
May 30, 2018  (JP) ................ 2018-104077

(51) Int. Cl.
*C03C 27/06*    (2006.01)
*E06B 3/66*     (2006.01)
*E06B 3/677*    (2006.01)

(52) U.S. Cl.
CPC ........... *C03C 27/06* (2013.01); *E06B 3/6612* (2013.01); *E06B 3/677* (2013.01)

(58) Field of Classification Search
CPC ...... E06B 3/6612; E06B 3/677; E06B 3/6775; C03C 27/06
See application file for complete search history.

(56) References Cited

U.S. PATENT DOCUMENTS 2,887,737 A * 5/1959 Prescott .................. C03C 27/10
52/204.52
6,468,610 B1 * 10/2002 Morimoto ........... E06B 3/66304
52/786.13

(Continued)

FOREIGN PATENT DOCUMENTS

CN    1616369 A  *  5/2005
CN    203999341 U    12/2014

(Continued)

OTHER PUBLICATIONS

CN-1616369-A (Tetsuo) May 18, 2005 (English language translation). [online] [retrieved Mar. 14, 2024]. Retrieved from: Clarivate Analytics. (Year: 2005).*

(Continued)

*Primary Examiner* — Erin Snelting
(74) *Attorney, Agent, or Firm* — Rimon P.C.

(57) ABSTRACT

A glass panel unit manufacturing method includes a bonding step, an insertion step, an evacuation step, and a sealing step. The bonding step includes bonding a first substrate having an evacuation port and a second substrate with a bonding material having a frame shape to form an internal space. The insertion step includes inserting a sealing material into the evacuation port. The evacuation step includes evacuating the internal space by connecting an exhaust device to the evacuation port and driving the exhaust device. The sealing step includes sealing the evacuation port with the sealing (Continued)

material while an evacuated state in the internal space is maintained. In the sealing step, a measured value by a pressure gauge is monitored while the sealing material is heated, softening of the sealing material is detected based on the transition of the measured value, and heating of the sealing material is stopped.

14 Claims, 11 Drawing Sheets

(56) References Cited

U.S. PATENT DOCUMENTS

| | | | |
|---|---|---|---|
| 2002/0121111 A1* | 9/2002 | Yoshizawa | E06B 3/6612 156/87 |
| 2012/0148795 A1 | 6/2012 | Kwon et al. | |
| 2014/0034218 A1 | 2/2014 | Hogan et al. | |
| 2016/0193818 A1 | 7/2016 | Hogan et al. | |
| 2017/0361598 A1 | 12/2017 | Hogan et al. | |
| 2019/0168496 A1 | 6/2019 | Hogan et al. | |
| 2020/0040645 A1* | 2/2020 | De Rycke | B23K 1/0008 |
| 2020/0190891 A1* | 6/2020 | Jensen | E06B 3/6612 |
| 2020/0332588 A1* | 10/2020 | Fujino | E06B 3/6775 |

FOREIGN PATENT DOCUMENTS

| | | |
|---|---|---|
| CN | 204298258 U | 4/2015 |
| JP | 2001-354456 A | 12/2001 |
| JP | 2013-508260 A | 3/2013 |
| JP | 2015-529623 A | 10/2015 |
| JP | 2017-141136 A | 8/2017 |
| KR | 10-2011-0077893 A | 7/2011 |
| WO | WO-2004035500 A1 * 4/2004 ............ E06B 3/6612 |

OTHER PUBLICATIONS

WO 2004-035500 A1 (Asano) Apr. 29, 2004 (English language translation). [online] [retrieved Mar. 14, 2024]. Retrieved from: Clarivate Analytics. (Year: 2004).*
International Search Report and Written Opinion issued in International Patent Application No. PCT/JP2019/016174, mailed on Jun. 11, 2019; with partial English translation.

* cited by examiner

FIG. 11 ized by being heated while an evacuated state in the internal space is maintained. In the sealing step, a measured value by the pressure gauge is monitored while the sealing material is
GLASS PANEL UNIT MANUFACTURING METHOD

CROSS-REFERENCE OF RELATED APPLICATIONS

This application is the U.S. National Phase under 35 U.S.C. § 371 of International Patent Application No. PCT/JP2019/016174, filed on Apr. 15, 2019, which in turn claims the benefit of Japanese Application No. 2018-104077, filed on May 30, 2018, the entire disclosures of which Applications are incorporated by reference herein.

TECHNICAL FIELD

The present disclosure relates to a glass panel unit manufacturing method.

BACKGROUND ART

A thermally insulating glass panel unit is obtained by reducing the pressure in an internal space formed between a pair of substrates arranged to face each other and hermetically sealing the internal space while maintaining the reduced pressure there.

Patent Literature 1 discloses a technique according to which an exhaust pipe made of glass is connected to an evacuation port formed in one of a pair of substrates, the pressure in an internal space is reduced through the exhaust pipe, and then the exhaust pipe is melted by heat and is cut off.

The known technique of the background art leaves a trace of the exhaust pipe thus cut off on an outer surface of a glass panel unit thus formed.

CITATION LIST

Patent Literature

Patent Literature 1: JP 2001-354456 A

SUMMARY OF INVENTION

It is an object of the present disclosure to provide a glass panel unit having evacuated internal space, such that no trace of an exhaust pipe is left thereon.

A glass panel unit manufacturing method according to one aspect of the present disclosure includes a bonding step, an insertion step, an evacuation step, and a sealing step. The bonding step is a step of bonding a first substrate and a second substrate together with a bonding material having a frame shape to form an internal space. The first substrate includes a glass panel and has an evacuation port. The second substrate includes a glass panel. The internal space is surrounded by the bonding material between the first substrate and the second substrate. The insertion step is a step of inserting a sealing material into the evacuation port of the first substrate. The evacuation step is a step of evacuating the internal space by connecting an exhaust device including a pressure gauge to the evacuation port and driving the exhaust device. The sealing step is a step of sealing the evacuation port with the sealing material softened by being heated while an evacuated state in the internal space is maintained. In the sealing step, a measured value by the pressure gauge is monitored while the sealing material is heated, softening of the sealing material is detected based on transition of the measured value, and heating of the sealing material is stopped.

DESCRIPTION OF EMBODIMENTS

Embodiment

A glass panel unit manufacturing method of one embodiment (hereinafter simply referred to as a "manufacturing method of one embodiment") will be described).

The manufacturing method of the one embodiment is a method for manufacturing a glass panel unit 9 and includes a bonding step, an insertion step, an evacuation step, and a sealing step.

In the manufacturing method of the one embodiment, the bonding step is first performed to form a work in progress 8. The work in progress 8 is an intermediate product obtained while the glass panel unit 9 is manufactured. In the insertion step performed after the bonding step, a sealing material 89 is inserted into an evacuation port 815 of the work in progress 8 thus formed. In the evacuation step and the sealing step performed after the insertion step, an internal space 85 is evacuated and sealed with an exhaust device 1 and a sealing head 7 shown in FIG. 7, thereby manufacturing the glass panel unit 9 having high thermal insulation properties. Each of the steps will be described in detail below.

Figure 1:
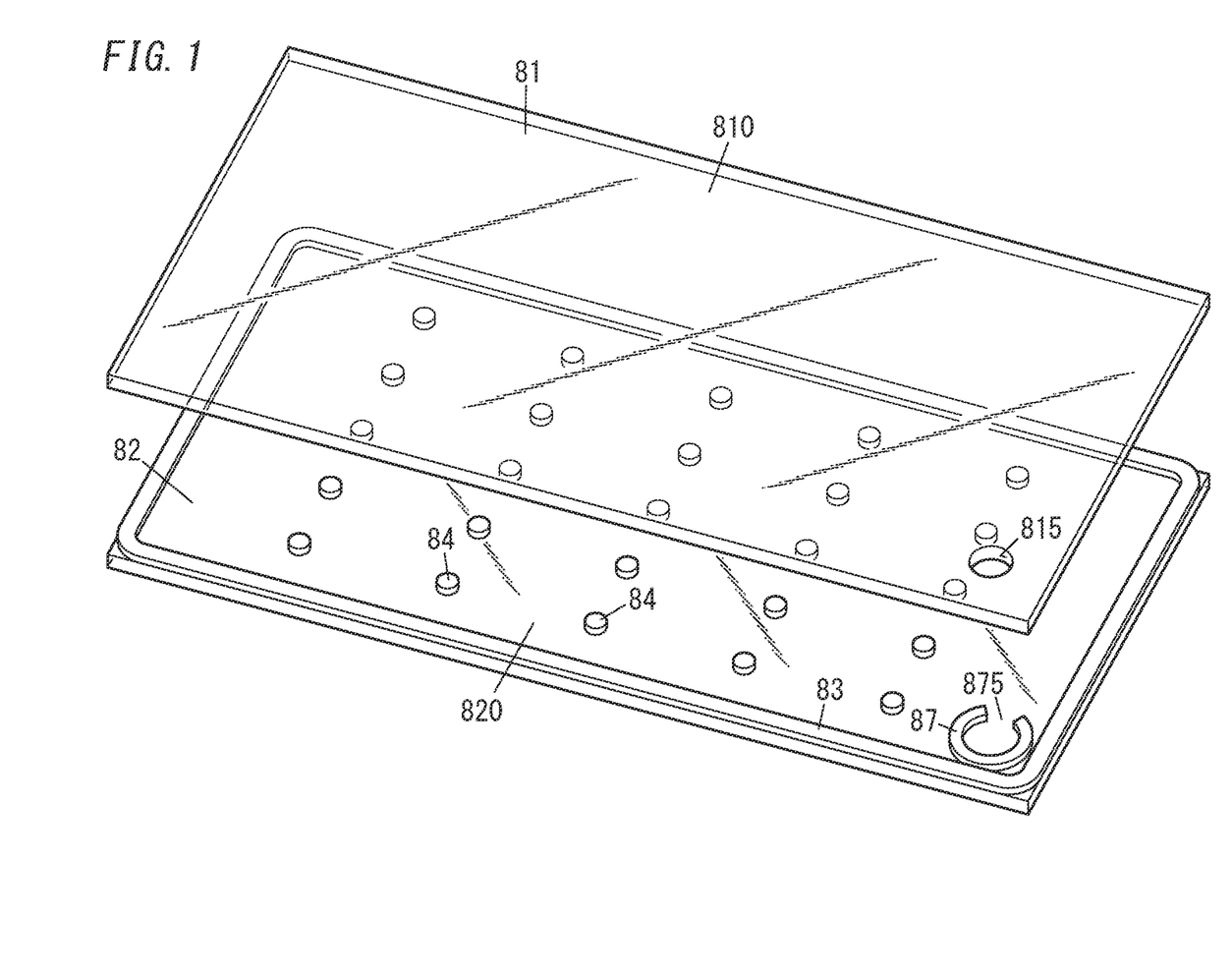
FIG. 1 is a perspective view illustrating a bonding step of a glass panel unit manufacturing method of one embodiment.

First of all, the bonding step will be described. As illustrated in FIG. 1 and the like, the bonding step includes disposing a first substrate 81, a second substrate 82, a bonding material 83, a plurality of pillars 84, and a dam 87 at respective prescribed locations. Specifically, the bonding material 83, the dam 87, and the plurality of pillars 84 are disposed on one surface of the second substrate 82 (in other words, an upper surface of the second substrate 82). The first substrate 81 is located above and faces the second substrate 82.

The first substrate 81 includes a glass panel 810 which is light transmissive. The second substrate 82 includes a glass panel 820 which is light transmissive. In the following description, the glass panel 810 included in the first substrate 81 is referred to as a first glass panel 810, and the glass panel 820 included in the second substrate 82 is referred to as a second glass panel 820.

Examples of materials for the first glass panel 810 and the second glass panel 820 include, but not limited to, soda-lime glass, high strain-point glass, chemically strengthened glass, no-alkali glass, quartz glass, Neoceram, and thermally strengthened glass.

Figure 3:
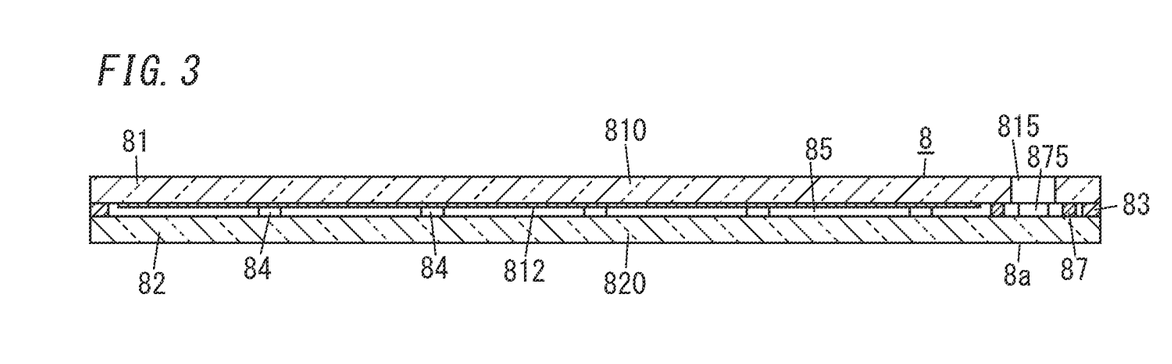
FIG. 3 is a sectional view along line A-A of FIG. 2.
Figure 4:
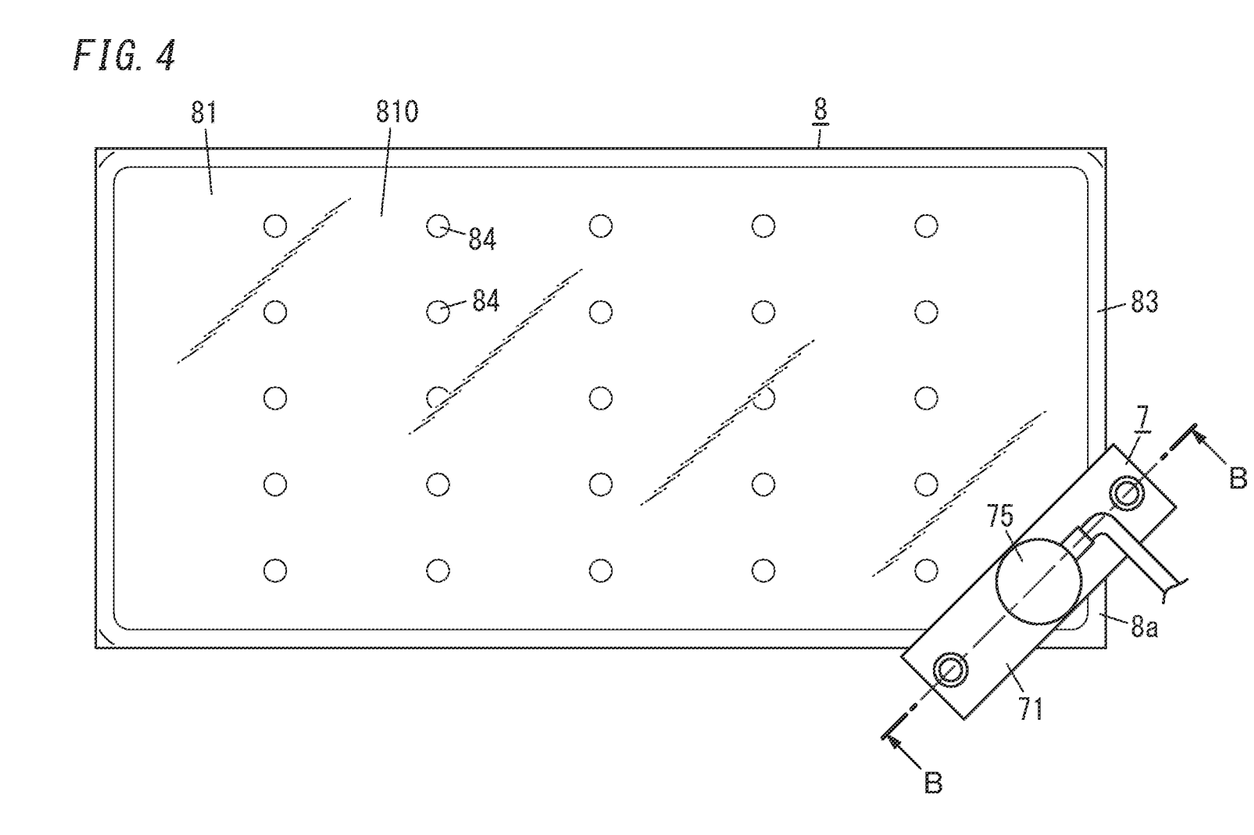
FIG. 4 is a plan view illustrating an evacuation step of the manufacturing method.

As illustrated in FIG. 3, a low-emissivity film 812 is bonded to one surface of the first glass panel 810 (in other words, a lower surface of the first glass panel 810). The first substrate 81 has a surface which faces the second substrate 82 and most of which is a surface of the low-emissivity film 812. The low-emissivity film 812 is a film containing metal, such as silver, with low emissivity and has the capability of reducing the transfer of heat due to radiation. The second substrate 82 has a surface which faces the first substrate 81 and which is a surface of the second glass panel 820.

For the first substrate 81, the low-emissivity film 812 is not essential, and the first substrate 81 does not have to include the low-emissivity film 812. The first substrate 81 may include, in place of the low-emissivity film 812, a film having a function different from the low-emissivity film 812. Similarly, the second substrate 82 may include the low-emissivity film or may include a film having a function different from the low-emissivity film.

The first substrate 81 has the evacuation port 815. The evacuation port 815 penetrates the first substrate 81 in a thickness direction of the first substrate 81. The evacuation port 815 penetrates the first glass panel 810 in a thickness direction of the first glass panel 810.

The bonding material 83 is disposed on the second substrate 82 (i.e., the second glass panel 820) by an application apparatus such as a dispenser. As illustrated in FIG. 1, the bonding material 83 is disposed to have a frame shape along an outer peripheral edge of the one surface of the second substrate 82 (in other words, the upper surface of the second substrate 82).

The dam 87 is disposed on the second substrate 82 (i.e., the second glass panel 820) by an application apparatus such as a dispenser in the same manner. The dam 87 is a portion for restricting a deformation range of the sealing material 89.

The dam 87 is disposed at a prescribed location on the one surface of the second substrate 82 (in other words, the upper surface of the second substrate 82). The bonding material 83 and the dam 87 are preferably made of the same material (e.g., glass frit) but may be made of different materials. The shape of the dam 87 is an annular shape having a cut-off 875 and is more specifically C-shaped, but the shape of the dam 87 is not limited to this example.

The plurality of pillars 84 are arranged in a regular pattern within an area which is part of the one surface of the second substrate 82 and which is surrounded by the bonding material 83. The dimensional shape, the number, and the pattern of the plurality of pillars 84 are not particularly limited. The plurality of pillars 84 are preferably made of a resin, but this should not be construed as limiting. The plurality of pillars 84 may be made of, for example, metal.

In the bonding step, the first substrate 81 and the second substrate 82 disposed to face each other as described above are hermetically bonded together via the bonding material 83.

Specifically, the first substrate 81 and the second substrate 82 between which the bonding material 83, the dam 87, and the plurality of pillars 84 are sandwiched are heated in a bonding furnace such as a circulating hot air oven, the bonding material 83 is once softened by heat, and then, the bonding material 83 is cured as the temperature lowers.

The internal space 85 is formed between the first substrate 81 and the second substrate 82 through the bonding step (see, for example, FIG. 3). The internal space 85 is surrounded by the first substrate 81, the second substrate 82, and the bonding material 83 and is communicated with the outside space through only the evacuation port 815.

Figure 2:
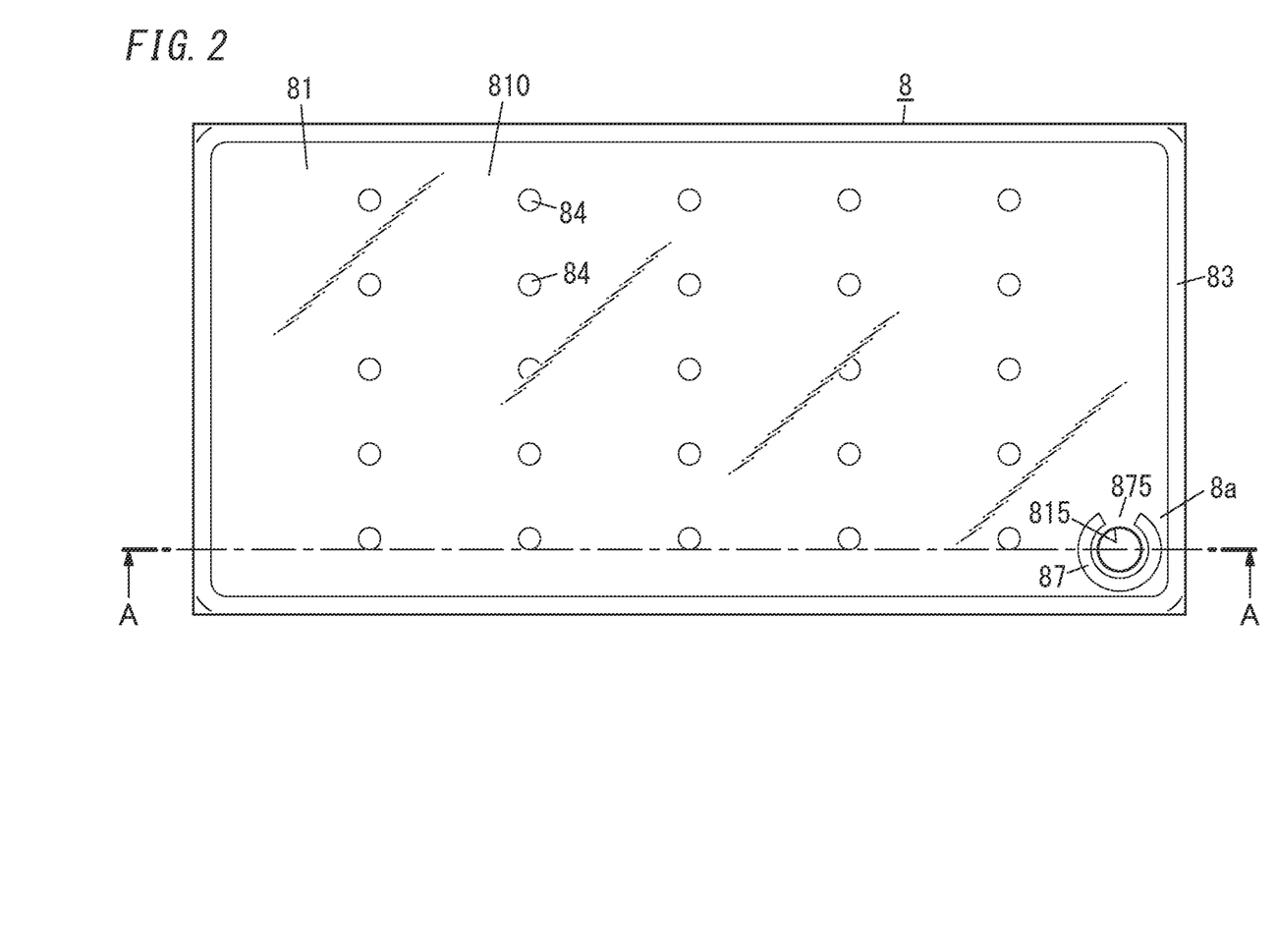
FIG. 2 is a plan view illustrating a work in progress formed by the bonding step.

As illustrated in FIG. 2, the evacuation port 815 of the first substrate 81 is surrounded by the dam 87 when viewed in a direction in which the first substrate 81 and the second substrate 82 face each other.

Next, the insertion step will be described. The insertion step is a step prior to the evacuation step and the sealing step and includes inserting the sealing material 89 and a plate 88 in this order into the evacuation port 815 of the work in progress 8. The sealing material 89 is, for example, a solid sealing material formed from glass frit. The plate 88 is a disk-shaped plate made of, for example, metal.

Each of the sealing material 89 and the plate 88 has an outer shape smaller than the outer shape of the evacuation port 815. The sealing material 89 is sandwiched between the plate 88 inserted in the evacuation port 815 and the second substrate 82.

Next, the evacuation step will be described. The evacuation step is executed by the exhaust device 1 and the sealing head 7 connected thereto. The sealing head 7 is detachably attached to a corner portion 8a of the work in progress 8.

Figure 5:
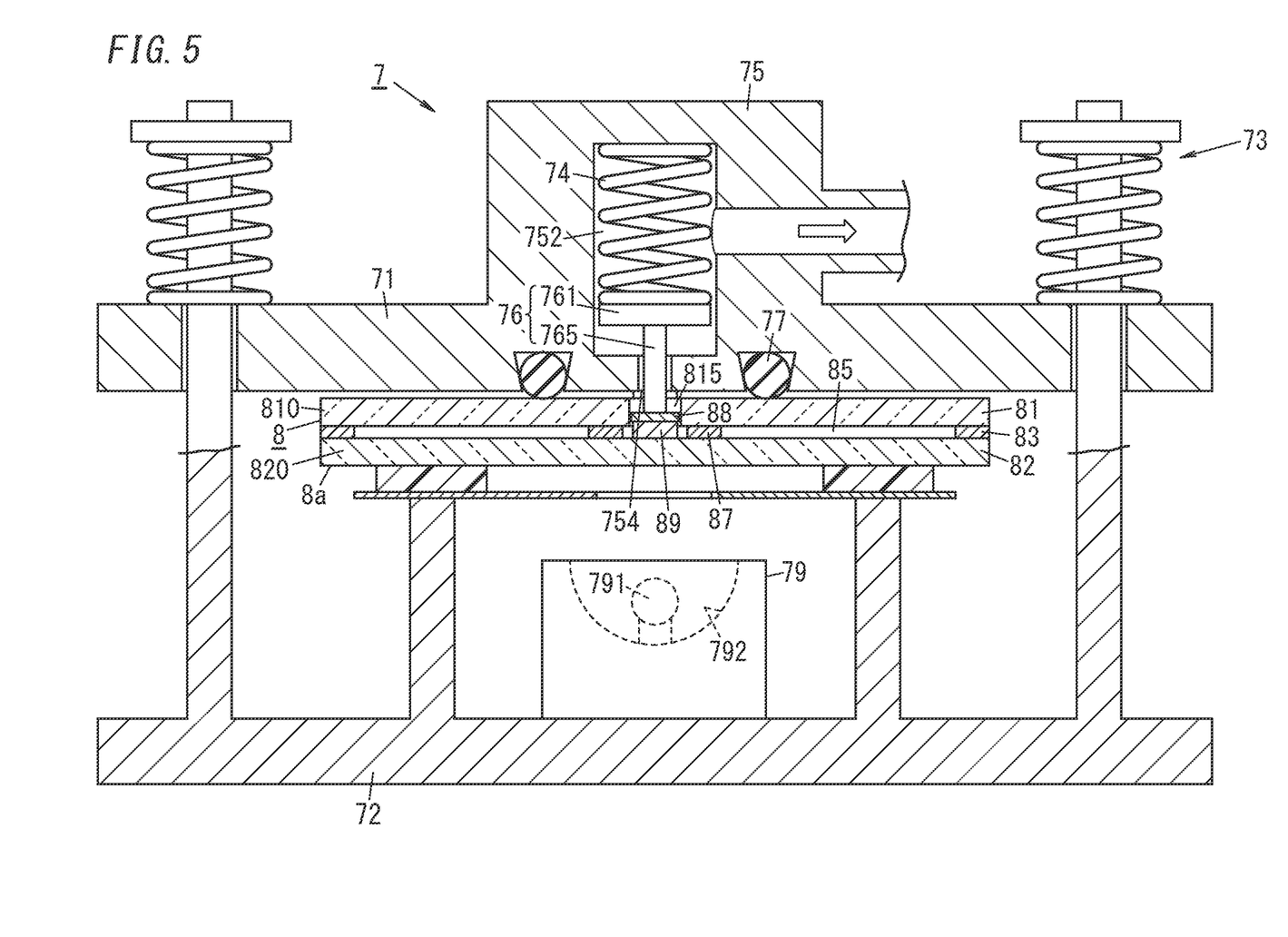
FIG. 5 is a sectional view taken along line B-B of FIG. 4.

As illustrated in FIG. 5 and the like, the sealing head 7 includes an tubular section 75 for exhaustion, a first frame 71 supporting the tubular section 75, a heater 79, a second frame 72 supporting the heater 79, and the spring mechanism 73. The spring mechanism 73 is configured to apply biasing force to the first frame 71 and the second frame 72 in a direction in Which the first frame 71 and the second frame 72 come close to each other. The first frame 71 and the second frame 72 are coupled to each other to be relatively displaceable in a direction in which the first substrate 81 and the second substrate 82 face each other.

The biasing force applied by the spring mechanism 73 presses the first frame 71 from above against the first substrate 81 and the second frame 72 from below against the second substrate 82.

The tubular section 75 has an evacuation space 752 formed in its interior. An opening 754 communicated with the evacuation space 752 is formed in a lower surface of the tubular section 75 (in other words, a surface of the tubular section 75 which faces the first substrate 81).

Figure 7:
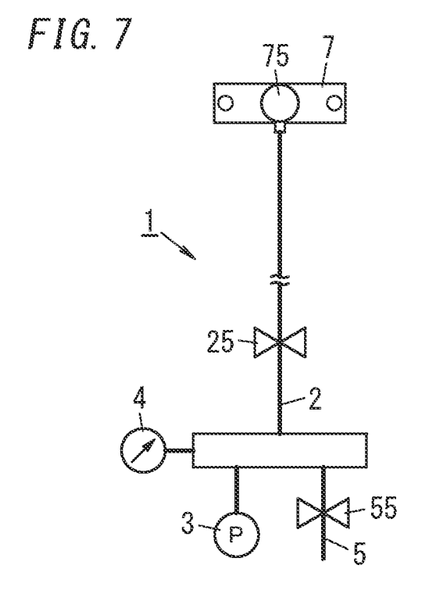
FIG. 7 is a schematic diagram illustrating an exhaust device used in the manufacturing method.

As schematically illustrated in FIG. 7, the tubular section 75 of the sealing head 7 is connected to a vacuum pump 3 through an exhaust passage 2. The exhaust device 1 used in the evacuation step includes the exhaust passage 2 connected to the sealing head 7, the vacuum pump 3 connected to the exhaust passage 2, a pressure gauge 4 connected to the exhaust passage 2, and a gas introduction path 5 connected to the exhaust passage 2. The exhaust passage 2 is provided with an on-off valve 25, and the gas introduction path 5 is provided with an on-off valve 55.

The sealing head 7 is attached to the work in progress 8, and the exhaust device 1 is driven (i.e., the vacuum pump 3 is driven), thereby exhausting air from the internal space 85 through the evacuation port 815 of the work in progress 8, the sealing head 7, and the exhaust passage 2. A state Where the sealing head 7 is attached to the work in progress 8 is, in other words, a state where the sealing head 7 is attached to the first substrate 81.

In the evacuation space 752 of the sealing head 7, a pressing member 76 is disposed. The pressing member 76 integrally includes a base 761 having a plate-like shape and a pushing pin 765 having a columnar shape and protruding downward from part of the base 761. In the evacuation space 752, the pressing member 76 is movable upward/downward (i.e., toward/away from the second substrate 82).

In the evacuation space 752, a spring member 74 configured to apply biasing force to the pressing member 76 is further disposed. The spring member 74 is pressed against the base 761 of the pressing member 76, thereby applying biasing force downward to the pressing member 76. The biasing force applied by the spring member 74 to the pressing member 76 is biasing force that pushes out the pushing pin 765 downward (i.e., in a direction toward the second substrate 82) through the opening 754.

The lower surface of the tubular section 75 has a portion surrounding the opening 754 and provided with an O-ring 77 which is elastic.

The heater 79 supported by the second frame 72 is an infrared radiator configured to emit infrared rays for local heating. The heater 79 is configured to externally irradiate the sealing material 89, which is inserted in the evacuation port 815 and which is heat fusible, with infrared rays through the second substrate 82 which is light transmissive (i.e., through the second glass panel 820), thereby locally heating the sealing material 89.

The heater 79 includes a heat source 791 configured to emit infrared rays and a focusing member 792 configured to focus the infrared rays emitted from the heat source 791 on a target site. The heat source 791 is preferably, but not limited to, a halogen lamp configured to emit near infrared rays.

With the sealing head 7 having the structure described above, the evacuation step is performed in the following way.

To perform the evacuation step, the work in progress 8 is set such that the first substrate 81 keeps its position located above the second substrate 82. In a state where the work in progress 8 is set, the evacuation port 815 is open upward.

As illustrated in FIG. 5, in a state where the sealing head 7 is attached to the corner portion 8a of the work in progress 8, a tip end of the pushing pin 765 protruding downward through the opening 754 of the tubular section 75 is pressed by the biasing force applied from the spring member 74 against an upper surface of the plate 88. The sealing material 89 and the plate 88 are vertically sandwiched between the second substrate 82 and the pressing member 76 by the biasing force applied from the spring member 74.

This brings the O-ring 77 of the sealing head 7 into airtight contact with the area, surrounding the evacuation port 815 entirely, of an upper surface of the first substrate 81.

In this state, opening the on-off valve 25 of the exhaust device 1 shown in FIG. 7 to drive the vacuum pump 3 discharges air from the evacuation space 752 of the sealing head 7 (see the hollow arrow in FIG. 5), and the internal space 85 of the work in progress 8 is evacuated to, for example, a pressure of $5.0 \times 10^{-4}$ Pa.

Next, the sealing step will be described. In the sealing step, the heater 79 supported by the second frame 72 is used to seal the evacuation port 815 while the evacuated state in the internal space 85 is maintained.

Figure 6:
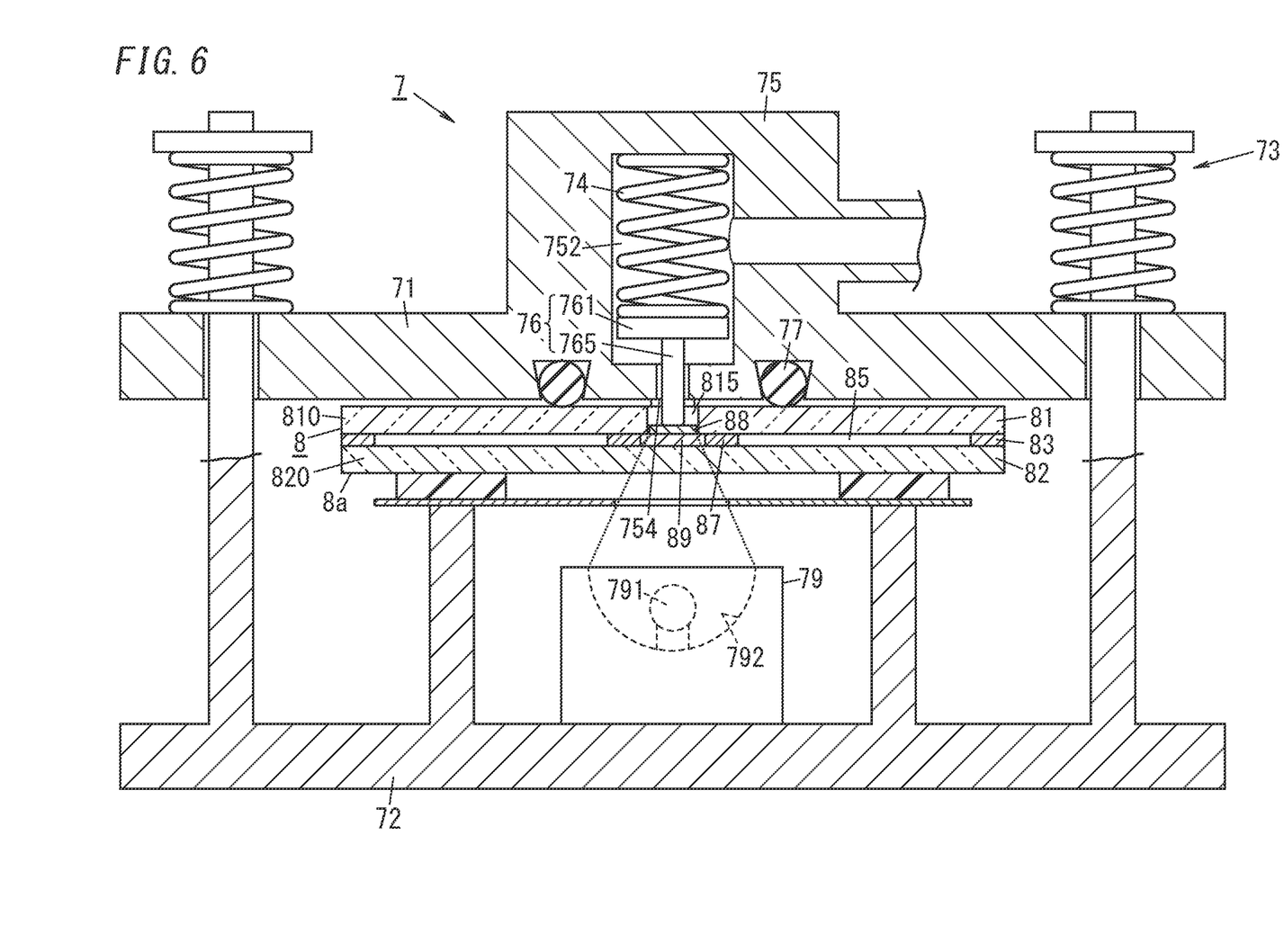
FIG. 6 is a sectional view illustrating a sealing step of the manufacturing method.

When the evacuated state in the internal space 85 is maintained, the heater 79 locally heats, in a non-contact manner, the sealing material 89 inserted in the evacuation port 815 (see FIG. 6).

The sealing material 89 starts softening when the softening point thereof is reached. The sealing material 89 thus softened is pushed toward the second substrate 82 by the biasing force applied by the spring member 74 via the pressing member 76 and the plate 88 to the sealing material 89 and is deformed in the internal space 85. At that time, the sealing material 89 is pressed to spread in a direction orthogonal to a direction in which the first substrate 81 and the second substrate 82 face each other.

Figure 8:
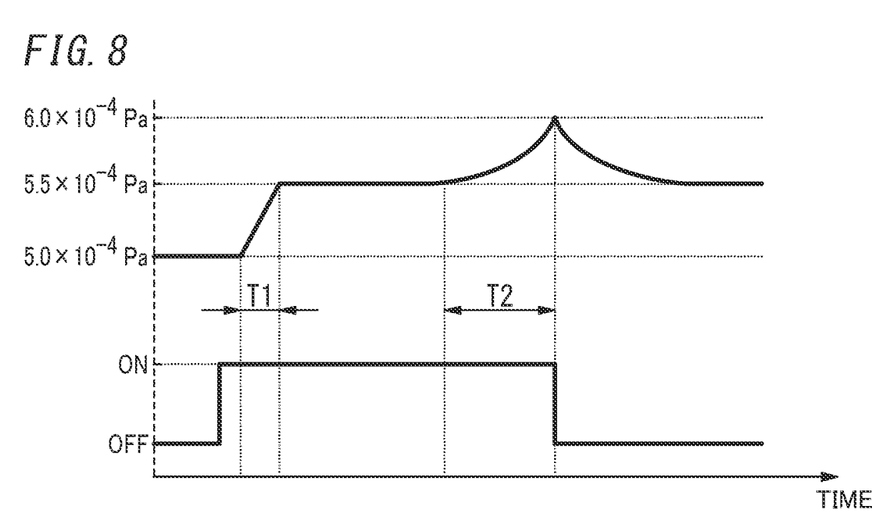
FIG. 8 is a timing diagram schematically illustrating pressure variations of the exhaust device and timings of heating.

FIG. 8 schematically shows timings at which heating of the sealing material 89 is stopped.

In the sealing step of the manufacturing method of the one embodiment, energization of the heat source 791 is stopped and the heating of the sealing material 89 is stopped at a timing at which it is determined that the sealing material 89 is softened to a prescribed extent. A measured value by the pressure gauge 4 of the exhaust device 1 shown in FIG. 7 is monitored, and based on the transition of the measured value, the timing may be detected.

The measured value by the pressure gauge 4 is the pressure value of the exhaust passage 2. The pressure gauge 4 is a so-called vacuum gauge. The pressure gauge 4 preferably includes a vacuum gauge tier a low vacuum (e.g., a Penning vacuum gauge) and a vacuum gauge for a high vacuum (e.g., a Pirani vacuum gauge).

In the sealing step of the manufacturing method of the one embodiment, energization of the heat source 791 is started and then, the pressure value of the exhaust passage 2 is monitored while driving of the vacuum pump 3 is continued. The transition of the pressure value of the exhaust passage 2 includes a first increment phase T1 and a second increment phase T2.

The first increment phase T1 is a pressure increase phase resulting from evaporation of moisture on the sealing material 89. The second increment phase T2 is a pressure increase phase resulting from generation of gas from the sealing material 89 when the sealing material 89 is softened (in other words, when the sealing material 89 is melted). A time interval is provided between the first increment phase T1 and the second increment phase T2.

That is, while vacuuming is continued, the heat source 791 is energized, and the sealing material 89 is started to be heated, and then, evaporation of moisture on the sealing material 89 increases the pressure of the exhaust passage 2. This period is the first increment phase T1. When the evaporation of the moisture is settled down (i.e., after a lapse of the first increment phase T1) and the sealing material 89 then reaches the predetermined temperature, the pressure of the exhaust passage 2 in turn increases due to softening of the sealing material 89. This period is the second increment phase T2.

When in the second increment phase T2, the measured value by the pressure gauge 4 exceeds a prescribed value (e.g., $6.0 \times 10^{-4}$ Pa), it is determined that the sealing material 89 is softened to the prescribed extent, and the heat source 791 is de-energized. The prescribed value in this embodiment is satisfactorily larger than the peak value of the first increment phase T1. The measured value by the pressure gauge 4 in the second increment phase 12 is, through the second increment phase T2, larger than the measured value by the pressure gauge 4 in the first increment phase T1. De-energization of the heat source 791 terminates the second increment phase T2.

The timing at which the measured value by the pressure gauge 4 exceeds the prescribed value may be detected by a worker by visual checking or the like, or a control device configured to automatically detect the timing and perform de-energization may be provided. The control device includes a microprocessor as a main component.

Figure 9:
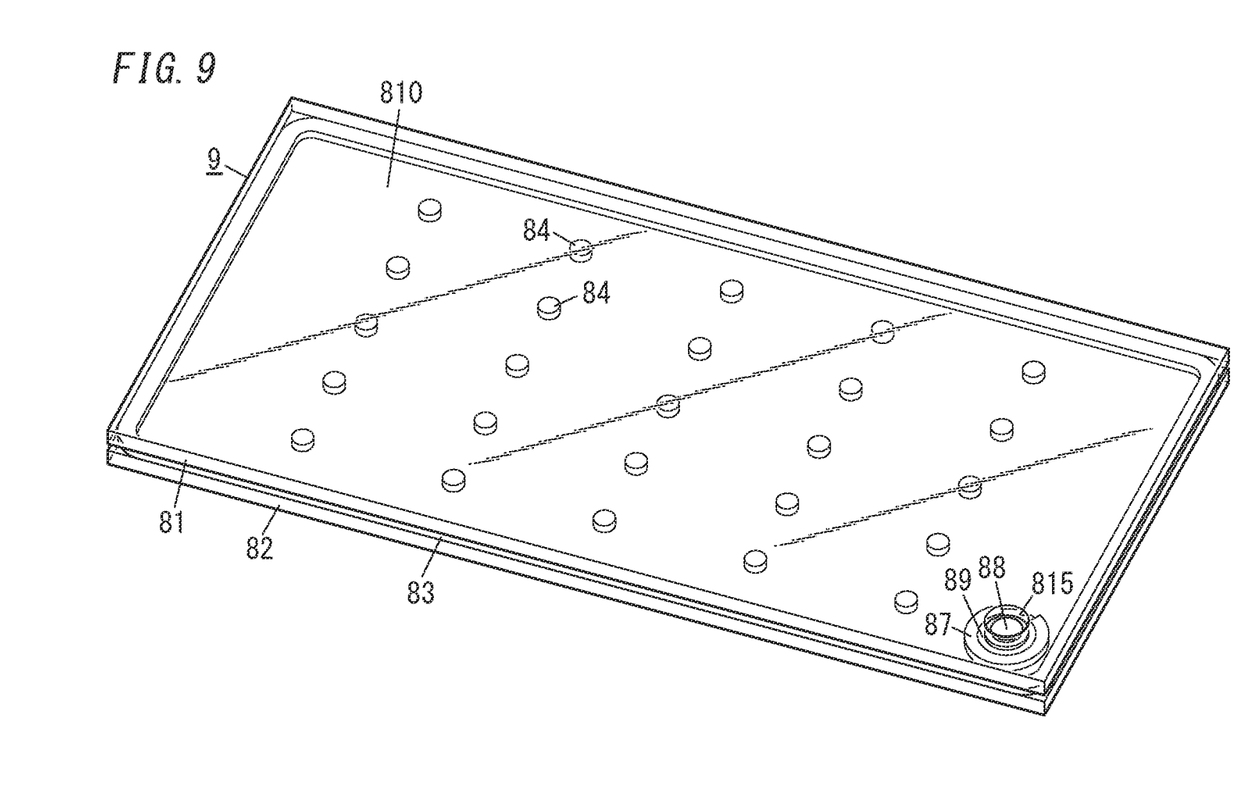
FIG. 9 is a perspective view illustrating a glass panel unit obtained by the manufacturing method.

The sealing step described above enables the internal space 85 to be sealed with an evacuated state therein, and thereby, a glass panel unit 9 having thermal insulation properties is obtained.

According to the manufacturing method of the one embodiment, simple processes performed with the exhaust device 1 and the sealing head 7 evacuate the internal space 85 of the work in progress 8, and the evacuation port 815 used for the evacuation can be highly reliably sealed with the sealing material 89. The glass panel unit 9 thus manufactured has no trace of the exhaust pipe, which is, however, left in a conventional technique.

In the sealing step of the manufacturing method of the one embodiment, the on-off valve 55 of the gas introduction path 5 is closed until the sealing step is completed, but control of the on-off valve 55 is not limited to this example. For example, it is also preferable that the vacuum pump 3 is stopped and the on-off valve 55 is opened when the sealing material 89 deformed blocks ventilation between the evacuation port 815 and the internal space 85. This introduces air through the gas introduction path 5 into the exhaust passage 2.

The air introduced into the exhaust passage 2 is supplied through the sealing head 7 toward the evacuation port 815 and applies, to the sealing material 89 softened, pressure for uniformly spreading the sealing material 89. Moreover, in the interior of the sealing material 89, microbubbles are formed when the sealing material 89 is softened (melted), but these bubbles are burst by the pressure of the air supplied through the sealing head 7 toward the evacuation port 815. The gas introduced into the exhaust passage 2 is not limited to the air, but in place of the air, compressed air may be introduced into the exhaust passage 2.

Moreover, in the insertion step of the manufacturing method of the one embodiment, the plate 88 is inserted into the evacuation port 815, but the plate 88 is not essential. The tip end of the pushing pin 765 may directly push the sealing material 89 without inserting the plate 88 into the evacuation port 815.

Moreover, in the manufacturing method of the one embodiment, the dam 87 for restricting the deformation range of the sealing material 89 is disposed in the internal space 85, but the dam 87 is not essential. Without providing the dam 87 in the internal space 85, the sealing material 89 may be deformed in the internal space 85, and the sealing material 89 after the deformation may seal the evacuation port 815.

Next, various types of variations of the manufacturing method of the one embodiment will be described. In the description of the variations, components similar to those described above will be designated by the same reference signs as those in the above description, and the detailed description thereof will be omitted herein. Components different from those described above will be described below.

(First Variation)

Figure 10:
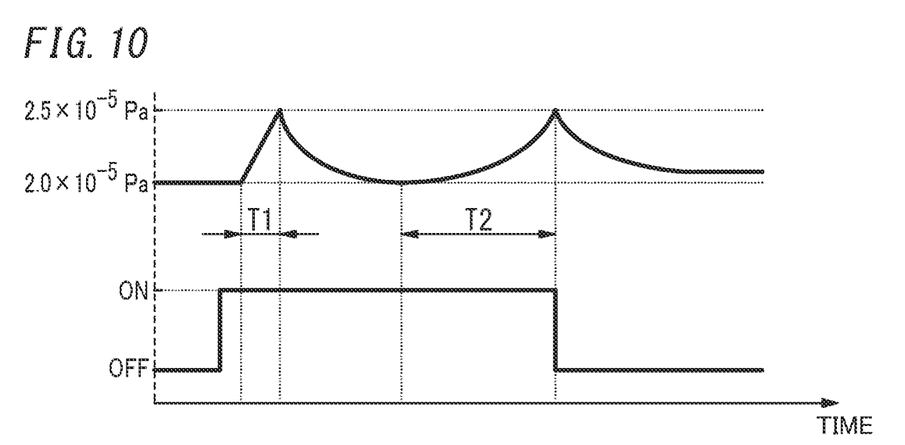
FIG. 10 is a timing diagram schematically illustrating pressure variations and timings of heating in a first variation of the manufacturing method.

FIG. 10 schematically shows timings at which heating of a sealing material 89 is stopped in a first variation of the manufacturing method of the one embodiment. The first variation is different from the manufacturing method of the one embodiment in terms of the performance of a vacuum pump 3. In an evacuation step of the first variation, the vacuum pump 3 is configured to evacuate an internal space 85 of a work in progress 8 to, for example, $2.0 \times 10^{-5}$ Pa.

The transition of the pressure value of an exhaust passage 2 in a sealing step of the first variation includes a first increment phase T1 and a second increment phase T2 in a similar manner to the manufacturing method of the one embodiment.

In the sealing step of the first variation, heating the sealing material 89 while continuing vacuuming first increases a measured value by a pressure gauge 4 to $2.5 < 10^{-5}$ Pa due to moisture evaporation. This period is the first increment phase T1. Then, the measured value of the pressure gauge 4 lowers to the peak value of the first increment phase T1 and then to about $2.0 \times 10^{-5}$ Pa. Thereafter, the measured value by the pressure gauge 4 increases again due to softening of the sealing material 89 (in other words, melting of the sealing material 89). This period is the second increment phase T2.

When in the second increment phase T2, the measured value by the pressure gauge 4 exceeds a prescribed value (e.g., $2.5 \times 10^{-5}$ Pa), it is determined that the sealing material 89 is softened to a prescribed extent, and the heat source 791 is de-energized. De-energization of the heat source 791 terminates the second increment phase T2.

The prescribed value is a mere example and may be set to a value in the range of $2.0 \times 10^{-5}$ Pa to $2.5 \times 10^{-5}$ Pa (i.e., a value smaller than the peak value of the first increment phase T1). Moreover, the prescribed value may be set to a value exceeding $2.5 \times 10^{-5}$ Pa (i.e., a value larger than the peak value of the first increment phase T1).

(Second Variation)

Figure 11:
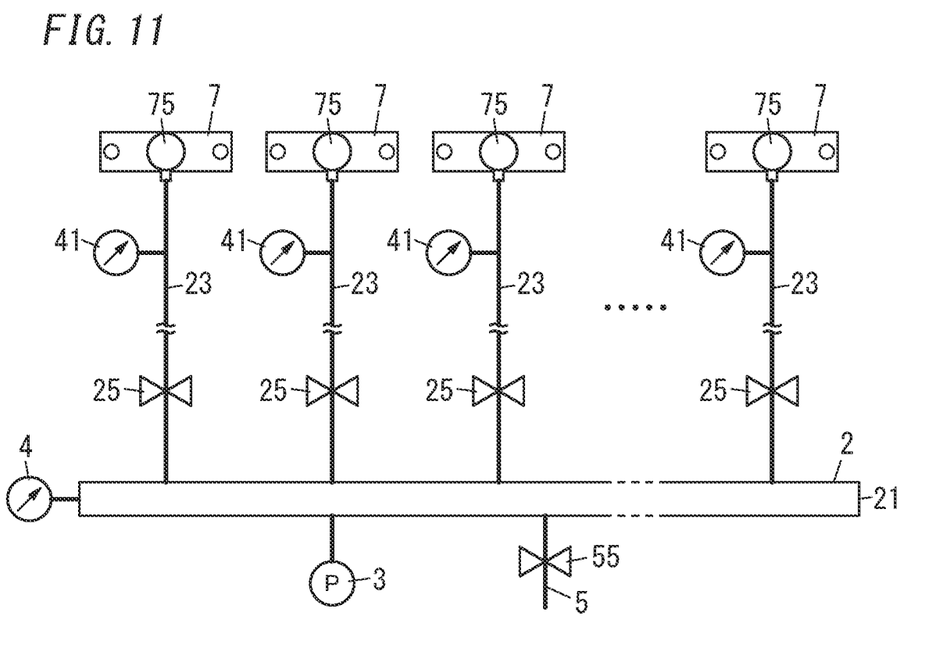
FIG. 11 is a view schematically illustrating an exhaust device used in a second variation of the manufacturing method.

FIG. 11 schematically shows an exhaust device 1 used in a second variation of the manufacturing method of the one embodiment. The second variation includes a plurality of sealing heads 7. The exhaust device 1 in the second variation includes an exhaust passage 2 connected to the plurality of sealing heads 7, a vacuum pump 3 connected to the exhaust passage 2, a plurality of pressure gauges 4 and 41 connected to the exhaust passage 2, and a gas introduction path 5 connected to the exhaust passage 2.

The exhaust passage 2 includes a manifold 21 and a plurality of pipelines 23 connected to the plurality of sealing heads 7 on a one-to-one basis. Each of the plurality of pipelines 23 is connected to the manifold 21. The plurality of pipelines 23 are provided with respective on-off valves 25. The vacuum pump 3, the pressure gauge 4, and the gas introduction path 5 are connected to the manifold 21. The pressure gauges 41 different from the pressure gauge 4 are connected to the respective pipelines 23.

A measured value by the pressure gauge 4 is the pressure value of the manifold 21. A measured value by each of the pressure gauges 41 is the pressure value of the pipeline 23 to which each of the pressure gauges 41 is connected.

Each pressure gauge 41 is a so-called vacuum gauge. The pressure gauge 41 preferably includes a vacuum gauge for a low vacuum (e.g., a Penning vacuum gauge) and a vacuum gauge liar a high vacuum (e.g., a Pirani vacuum gauge).

In an evacuation step of the second variation, the plurality of sealing heads 7 are attached to a plurality of works in progress 8 on a one-to-one basis, and the vacuum pump 3 is driven, and thereby, internal spaces 85 of the plurality of works in progress 8 are simultaneously evacuated.

In a sealing step of the second variation, in the work in progress 8, heaters 79 of the sealing heads 7 attached to the respective works in progress 8 heat the sealing material 89 At this time, pressures of the pipelines 23 connected to the sealing heads 7 are monitored by the pressure gauges 41 connected to the respective pipelines 23, Thus, based on the transition of the measured values by the pressure gauges 41, timings for stopping heating of the respective sealing heads 7 are individually detectable.

Alternatively, unlike the above-described case where the timings at which the plurality of sealing heads 7 are stopped are not individually detected, timings for stopping the heating of the plurality of sealing heads 7 are also collectively detectable. Specifically, in the sealing step, the pressure of the manifold 21 is monitored by the pressure gauge 4, and based on the transition of the measured value by the pressure gauge 4, the timings for stopping the heating of the plurality of sealing heads 7 can be collectively detected.

The second variation enables the plurality of works in progress 8 to be collectively subjected to the evacuation step and the sealing step to concurrently manufacture a plurality of glass panel units 9.

(Aspects)

As can be seen from the one embodiment and various types of variations of the one embodiment, a glass panel unit manufacturing method of a first aspect includes a bonding step, an insertion step, an evacuation step, and a sealing step. The bonding step includes bonding a first substrate (81) and a second substrate (82) together with a bonding material (83) having a frame shape. The first substrate (81) includes a glass panel (810) and has an evacuation port (815). The second substrate (82) includes a glass panel (820). Thus, an internal space (85) surrounded by the bonding material (83) is formed between the first substrate (81) and the second substrate (82). The insertion step is a step of inserting a sealing material (89) into the evacuation port (815) of the first substrate (81). The evacuation step is a step of evacuating the internal space (85) by connecting an exhaust device (1) including a pressure gauge (4; 41) to the evacuation port (815) and driving the exhaust device (1). The sealing step includes heating the sealing material (89) while an evacuated state in the internal space (85) is maintained and sealing the evacuation port (815) with the sealing material (89) softened by being heated. In the sealing step, a measured value by the pressure gauge (4; 41) is monitored while the sealing material (89) is heated, softening of the sealing material (89) is detected based on transition of the measured value, and heating of the sealing material (89) is stopped.

According to the glass panel unit manufacturing method of a first aspect, monitoring a pressure variation in the exhaust device (1) enables softening of the sealing material (89) to be detected to stop the heating without separately providing a sensor for detecting the temperature of the sealing material (89). A glass panel unit (9) manufactured has no trace of the exhaust pipe, which is, however, left in a conventional technique.

A glass panel unit manufacturing method of a second aspect is realized in combination with the first aspect. In the glass panel unit manufacturing method of the second aspect, in the sealing step, the measured value increases after the heating of the sealing material (89) is started, and at a timing at which the measured value exceeds a prescribed value, the heating of the sealing material (89) is stopped.

According to the glass panel unit manufacturing method of the second aspect, the timing for stopping the heating is appropriately determined based on the pressure variation of the exhaust device (1).

A glass panel unit manufacturing method of a third aspect is realized in combination with the first aspect. In the glass panel unit manufacturing method of the third aspect, in the sealing step, the transition of the measured value after the heating of the sealing material (89) is started includes a first increment phase (T1) and a second increment phase (T2). The heating of the sealing material (89) is stopped at a timing at which the measured value exceeds a prescribed value in the second increment phase (T2).

In the glass panel unit manufacturing method of the third aspect, the timing for stopping the heating is appropriately determined based on the pressure variation of the exhaust device (1).

A glass panel unit manufacturing method of a fourth aspect is realized in combination with the third aspect. In the glass panel unit manufacturing method of the fourth aspect, a time interval is provided between the first increment phase (T1) and the second increment phase (T2).

According to the glass panel unit manufacturing method of a fourth aspect, the timing for stopping the heating is appropriately determined based on the pressure variation of the exhaust device (1).

A glass panel unit manufacturing method of a fifth aspect is realized in combination with the third or fourth aspect. In the glass panel unit manufacturing method of the fifth aspect, the first increment phase (T1) corresponds to a pressure increase resulting from moisture evaporation from the sealing material (89).

According to the glass panel unit manufacturing method of a fifth aspect, the timing for stopping the heating is appropriately determined based on the pressure variation of the exhaust device (1).

A glass panel unit manufacturing method of a sixth aspect is realized in combination with the third or fourth aspect. In the glass panel unit manufacturing method of the sixth aspect, the second increment phase (T2) corresponds to a pressure increase resulting from generation of gas from the sealing material (89) when the sealing material (89) is softened.

According to the glass panel unit manufacturing method of the sixth aspect, the timing for stopping the heating is appropriately determined based on the pressure variation of the exhaust device (1).

A glass panel unit manufacturing method of a seventh aspect is realized in combination with the fourth aspect. In the glass panel unit manufacturing method of the seventh aspect, the first increment phase (T1) corresponds to a pressure increase resulting from moisture evaporation from the sealing material (89), and The second increment phase (T2) corresponds to a pressure increase resulting from generation of gas from the sealing material (89) when the sealing material (89) is softened.

According to the glass panel unit manufacturing method of a seventh aspect, the timing for stopping the heating is appropriately determined based on the pressure variation of the exhaust device (1).

A glass panel unit manufacturing method of an eighth aspect is realized in combination with any one of the third to seventh aspects. In the glass panel unit manufacturing method of the eighth aspect, the prescribed value is larger than a peak value of the first increment phase (T1).

According to the glass panel unit manufacturing method of the eighth aspect, the timing for stopping the heating is appropriately determined based on the pressure variation of the exhaust device (1).

A glass panel unit manufacturing method of a ninth aspect is realized in combination with any one of the third to seventh aspects. In the glass panel unit manufacturing method of the ninth aspect, the prescribed value is smaller than a peak value of the first increment phase (T1).

According to the glass panel unit manufacturing method of the ninth aspect, the timing for stopping the heating is appropriately determined based on the pressure variation of the exhaust device (1).

A glass panel unit manufacturing method of a tenth aspect is realized in combination with any one of the first to ninth aspects. In the glass panel unit manufacturing method of the tenth aspect, the exhaust device (1) includes an exhaust passage (2), a vacuum pump (3) connected to the exhaust passage (2), and a pressure gauge (4; 41) connected to the exhaust passage (2).

According to the glass panel unit manufacturing method of the tenth aspect, monitoring the measured value by the pressure gauge (4:41) enables a timing for stopping the heating to be appropriately determined.

A glass panel unit manufacturing method of an eleventh aspect is realized in combination with the tenth aspect. In the glass panel unit manufacturing method of the eleventh aspect, the evacuation step and the sealing step are performed with an exhaust device (1) and a sealing head (7) connected to the exhaust passage (2) in a state where the sealing head (7) is attached to the first substrate (81).

According to the glass panel unit manufacturing method of the eleventh aspect, the evacuation step and the sealing step are executed by the exhaust device (1) and the sealing head (7), and the measured value by the pressure gauge (4:41) is monitored in the sealing step, thereby appropriately determining the timing for stopping the heating.

A glass panel unit manufacturing method of a twelfth aspect is realized in combination with the eleventh aspect. In the glass panel unit manufacturing method of the twelfth aspect, a plurality of the sealing heads (7) are used in the evacuation step and the sealing step.

According to the glass panel unit manufacturing method of the twelfth aspect, a plurality of glass panel units (9) are concurrently manufactured by the plurality of sealing heads (7).

A glass panel unit manufacturing method of a thirteenth aspect is realized in combination with any one of the first to twelfth aspects. In the glass panel unit manufacturing method of the thirteenth aspect, in the sealing step, the sealing material (89) is irradiated with infrared rays through the second substrate (82) to locally heat the sealing material (89).

According to the glass panel unit manufacturing method of the thirteenth aspect, the sealing material (89) is efficiently locally heated while the evacuated state in the internal space (85) is maintained.

A glass panel unit manufacturing method of a fourteenth aspect is realized in combination with the thirteenth aspect. In the glass panel unit manufacturing method of the fourteenth aspect, in the sealing step, the sealing material (89) is heated, and biasing force for pushing the sealing material (89) toward the second substrate (82) is applied.

According to glass panel unit manufacturing method of the fourteenth aspect, the sealing material (89) softened by being heated and deformed by the biasing force to seal the evacuation port (815).

REFERENCE SIGNS LIST

1 EXHAUST DEVICE
2 EXHAUST PASSAGE.
3 VACUUM PUMP
4 PRESSURE GAUGE
41 PRESSURE GAUGE
7 SEALING HEAD
81 FIRST SUBSTRATE
810 GLASS PANEL
815 EVACUATION PORT
82 SECOND SUBSTRATE
820 GLASS PANEL
83 BONDING MATERIAL
85 INTERNAL SPACE
89 SEALING MATERIAL
9 PANEL UNIT
T1 FIRST INCREMENT PHASE
T2 SECOND INCREMENT PHASE

The invention claimed is:

1. A glass panel unit manufacturing method, comprising:
   a bonding step of bonding a first substrate and a second substrate together with a bonding material having a frame shape to form an internal space, the first substrate including a glass panel and having an evacuation port, the second substrate including a glass panel, the internal space being surrounded by the bonding material between the first substrate and the second substrate;
   an insertion step of inserting a sealing material into the evacuation port of the first substrate;
   an evacuation step of evacuating the internal space by connecting an exhaust device including a pressure gauge to the evacuation port and driving the exhaust device; and
   a sealing step of heating the sealing material while an evacuated state in the internal space is maintained and sealing the evacuation port with the sealing material softened by being heated,
   in the sealing step, a measured value by the pressure gauge being monitored while the sealing material is heated, softening of the sealing material being detected based on transition of the measured value, and heating of the sealing material being stopped.

2. The glass panel unit manufacturing method of claim 1, wherein
   in the sealing step, the measured value increases after the heating of the sealing material is started, and at a timing at which the measured value exceeds a prescribed value, the heating of the sealing material is stopped.

3. The glass panel unit manufacturing method of claim 1, wherein
   in the sealing step, the transition of the measured value after the heating of the sealing material is started includes a first increment phase and a second increment phase, the heating of the sealing material being stopped at a timing at which the measured value exceeds a prescribed value in the second increment phase.

4. The glass panel unit manufacturing method of claim 3, wherein
   a time interval is provided between the first increment phase and the second increment phase.

5. The glass panel unit manufacturing method of claim 4,
   the first increment phase corresponds to a pressure increase resulting from moisture evaporation from the sealing material, and
   the second increment phase corresponds to a pressure increase resulting from generation of gas from the sealing material when the sealing material is softened.

6. The glass panel unit manufacturing method of claim 3, wherein
   the first increment phase corresponds to a pressure increase resulting from moisture evaporation from the sealing material.

7. The glass panel unit manufacturing method of claim 3, wherein the second increment phase corresponds to a pressure increase resulting from generation of gas from the sealing material when the sealing material is softened.

8. The glass panel unit manufacturing method of claim 3, wherein the prescribed value is larger than a peak value of the first increment phase.

9. The glass panel unit manufacturing method of claim 3, wherein the prescribed value is smaller than a peak value of the first increment phase.

10. The glass panel unit manufacturing method of claim 1, wherein the exhaust device includes an exhaust passage, a vacuum pump connected to the exhaust passage, and the pressure gauge connected to the exhaust passage.

11. The glass panel unit manufacturing method of claim 10, wherein the evacuation step and the sealing step are performed with the exhaust device and a sealing head connected to the exhaust passage in a state where the sealing head is attached to the first substrate.

12. The glass panel unit manufacturing method of claim 11, wherein a plurality of sealing heads are used in the evacuation step and the sealing step.

13. The glass panel unit manufacturing method of claim 1, wherein in the sealing step, the sealing material is irradiated with infrared rays through the second substrate to locally heat the sealing material.

14. The glass panel unit manufacturing method of claim 13, wherein in the sealing step, the sealing material is heated, and biasing force for pushing the sealing material toward the second substrate is applied.

* * * * *